W. V. TURNER.
FLUID PRESSURE BRAKE.
APPLICATION FILED MAY 11, 1908.
1,131,179.
Patented Mar. 9, 1915.
2 SHEETS—SHEET 1.
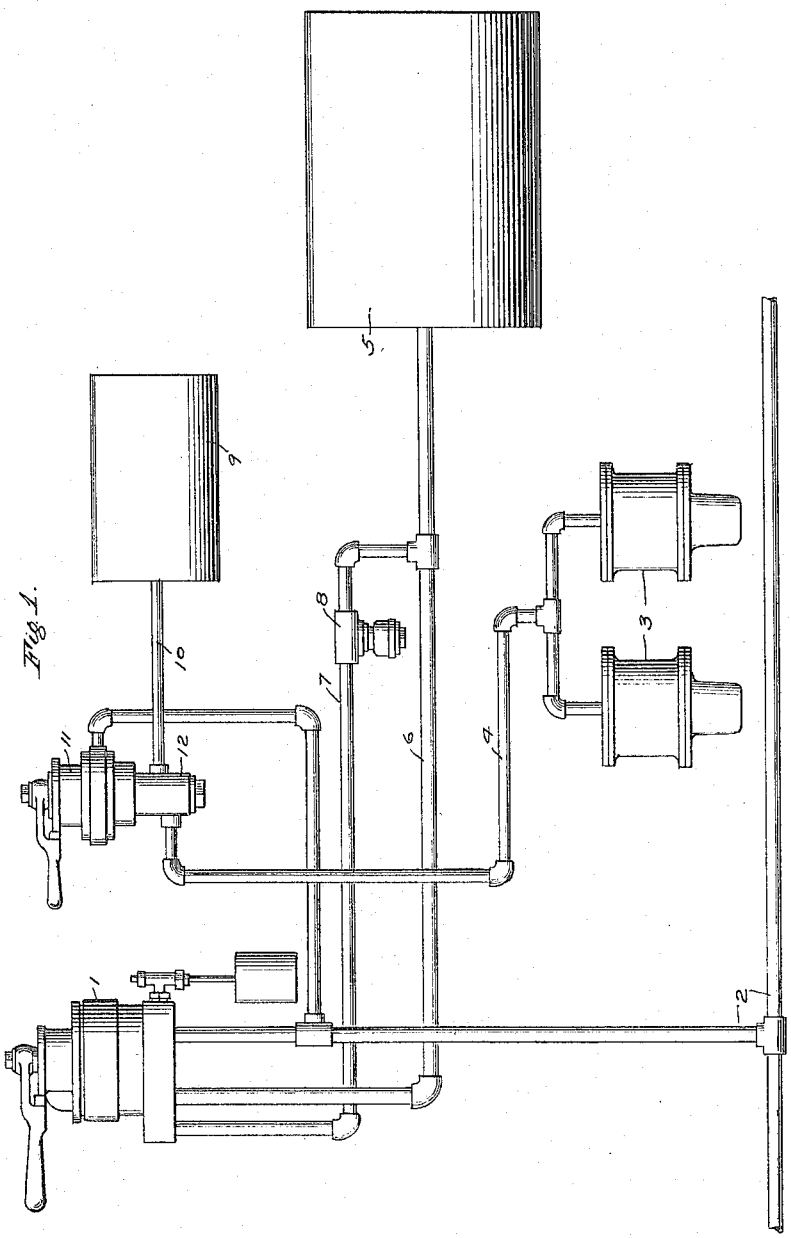
WITNESSES
Wm. M. Cady
J. S. Custer
INVENTOR
Walter V. Turner
by E. Wright
Att'y.

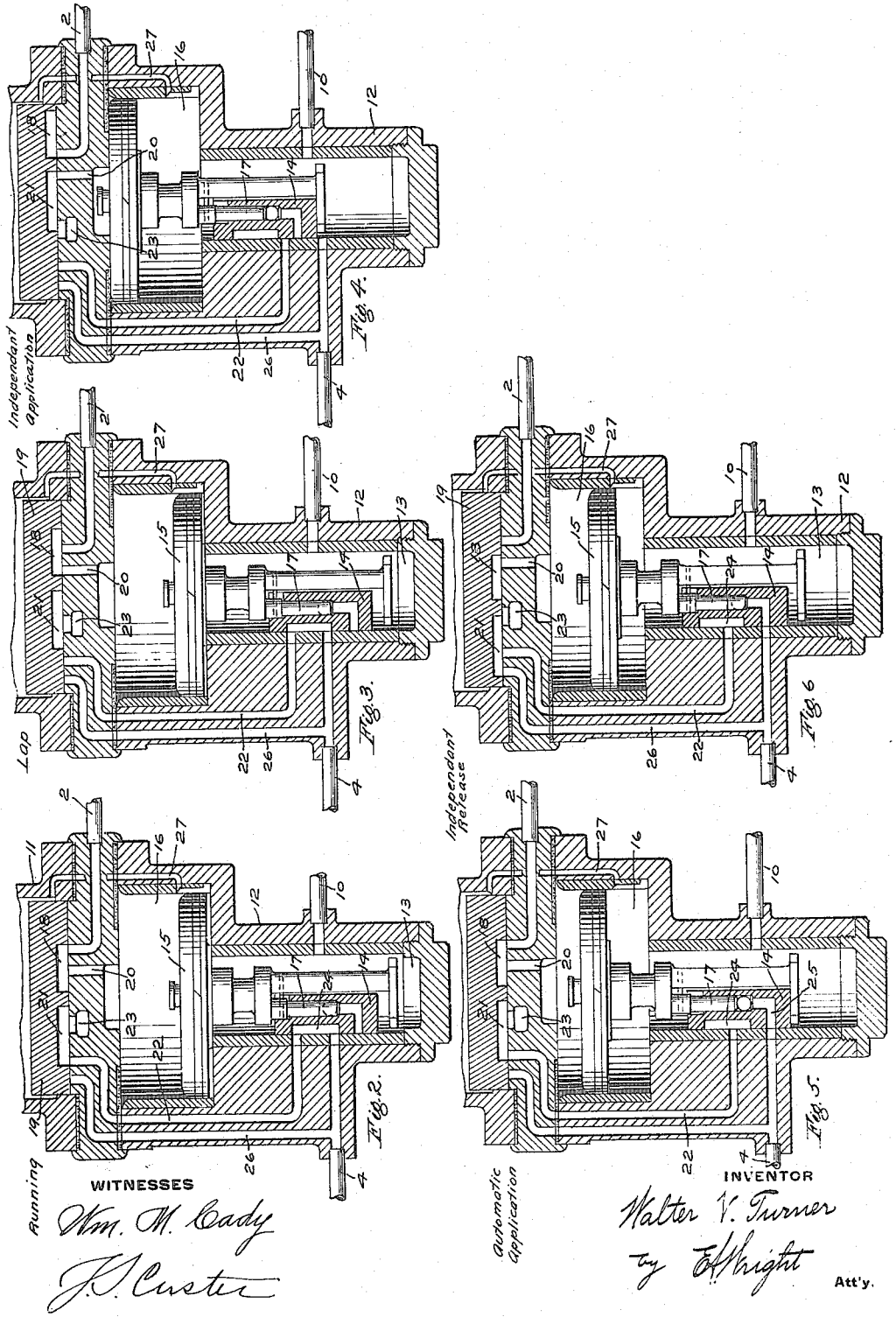

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,131,179.   Specification of Letters Patent.   Patented Mar. 9, 1915.

Application filed May 11, 1908. Serial No. 432,195.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to an air brake equipment designed to be applied to steam or electric locomotives for controlling the brakes thereon, either with or independently of the train brakes.
The principal object of my invention is to provide a simply constructed apparatus of the above character having few parts and easily manipulated to produce the desired results.
In the accompanying drawings; Figure 1 is a diagrammatic view, illustrating a locomotive air brake equipment with my improvements applied thereto, and Figs. 2 to 6 inclusive central sectional views of the combined automatic valve device and independent brake valve, showing the relative position of the parts in running, lap, independent application, automatic application, and independent release positions respectively.

As shown in Fig. 1 of the drawings, the locomotive air brake equipment comprises an engineer's brake valve 1, automatic brake pipe 2, driver brake cylinders 3, driver brake cylinder pipe 4, main reservoir 5, main reservoir pipe 6, main reservoir reducing feed valve pipe 7, provided with the usual reducing valve 8, auxiliary reservoir 9, and auxiliary reservoir pipe 10, and so far the parts are all of the usual construction. According to a preferred form of my invention I provide an independent brake valve 11 to which is secured the casing 12 of an automatic or triple valve device, the auxiliary reservoir pipe 10 being connected to the valve chamber 13 of the triple valve and the brake cylinder pipe 4 opening to the valve seat of the main slide valve 14 thereof. The triple valve device also comprises the usual piston 15 contained in the piston chamber 16 for operating the main slide valve 14 and the graduating valve 17.

In the normal running position of the independent brake valve, as shown in Fig. 2, a cavity 18 in the rotary valve 19 thereof connects the automatic brake pipe 2 with a passage 20 opening into the piston chamber 16, and a cavity 21 therein connects a passage 22 leading to the seat of the main slide valve 14, with an exhaust port 23. When air is supplied to the automatic brake pipe by the usual operation of the engineer's brake valve, the same flows through the cavity 18 and passage 20 to the piston chamber 16 and thence around the triple valve piston 15, which is shifted to full release position, through the usual feed groove, charging the main slide valve chamber and the auxiliary reservoir to the standard brake pipe pressure. A passage 27 is provided, which is open to the piston chamber 16 in the release position of the triple valve piston, and leads to the chamber above the rotary valve 19, so as to maintain the pressure therein at the brake pipe pressure and prevent the possibility of the valve being raised or lifted from its seat.

In the full release position of the triple or automatic valve device, a cavity 24 in the main slide valve 14 connects the brake cylinder pipe 4 with passage 22, so that the brake cylinder is now open to the exhaust port 23 of the independent brake valve.

Upon operating the engineer's brake valve to effect a reduction in train pipe pressure the triple valve piston 15 is actuated with the triple valve pistons on the cars in the usual way, and assumes the automatic application position, as shown in Fig. 5 of the drawings, in which the auxiliary reservoir supply port 25 registers with brake cylinder port 4, so that air from the auxiliary reservoir is admitted to the brake cylinder.

Upon equalization of pressures on opposite sides of the triple valve piston the graduating valve closes the auxiliary reservoir passage 25. Automatic release of the brakes is obtained by increasing the brake pipe pressure, by which the triple valve piston shifts the main slide valve to full release position, connecting the brake cylinder port 4 with the passage 22 and thence by cavity 21 the fluid in the brake cylinder is released to the exhaust port 23.

If it is desired to operate the locomotive brakes independently of the train brakes, the independent brake valve handle is turned to independent application position, as shown in Fig. 4, in which the piston chamber 16 is connected through passage 20 and cavity 21 with the exhaust port 23. The piston 15 is thereupon shifted to its extreme outward position so that the brake cylinder port 4 is uncovered by the main slide valve 14 and air from the auxiliary reservoir is admitted to the brake cylinder. When the desired brake cylinder pressure is attained, the independent brake valve is turned to lap position, as shown in Fig. 3. In this position, the piston chamber 16 is connected to the automatic brake pipe 2, through cavity 18 and passage 20, so that the triple valve piston is shifted to full release position by the brake pipe pressure. It will, however, be noted that in the lap position, the cavity 21 is shifted so that the passage 22 is cut off from the exhaust port 23, and the fluid under pressure admitted to the brake cylinder is held or retained therein. The brake cylinder pressure may be increased as desired by moving the independent brake valve handle to independent application position and back to lap. While in lap position, it will also be noted that the brake pipe is connected to the auxiliary reservoir through the feed groove around the piston, so that the auxiliary reservoir is maintained practically at the standard brake pipe pressure throughout independent applications of the locomotive brakes.

The locomotive brakes may be released by turning the independent brake valve handle to the running position, Fig. 2, in which the passage 22 is connected by the cavity 21 with exhaust port 23.

I also provide means for releasing the locomotive brakes independently of the position of the automatic valve device, as where an automatic application has been made and the connection from the brake cylinder to the passage 22 is cut off. For this purpose a passage 26, leading from the brake cylinder passage 4 opens at the valve seat of the rotary valve 19. This passage 26 is so located that upon turning the independent brake valve handle to the independent release position, as shown in Fig. 6, the cavity 21 connects said passage with the exhaust port 23. Thus, when it is desired to release only the locomotive brakes, whether applied independently or automatically, the independent brake valve handle is turned to the independent release position and air is released directly from the brake cylinder through the passage 26.

It will now be apparent that the locomotive brakes may be gradually applied or released independently of the train brakes, and the locomotive brakes may be held applied while releasing the train brakes or released while holding the train brakes by means of a simple apparatus of few parts.

Having now described my invention, what I claim as new and desire to secure by Letters Patent, is:—

1. In a fluid pressure brake, the combination with a brake pipe, and an automatic valve device operated by variations in brake pipe pressure for supplying and releasing air to and from the brake cylinder, of a manually operated valve having means for also controlling the operation of said valve device to apply and release the brakes and having a position for releasing air directly from the brake cylinder.

2. In a fluid pressure brake, the combination with a brake pipe and an automatic valve device operated by reduction in brake pipe pressure for supplying air to the brake cylinder, of an independent manually operated valve, having means for controlling the operation of said valve device to apply and release the brakes and having a position for closing the outlet from the brake cylinder exhaust of said automatic valve device.

3. In a fluid pressure brake, the combination with a brake pipe, engineer's brake valve, auxiliary reservoir, and a triple valve device operated by a reduction in brake pipe pressure for supplying air from the auxiliary reservoir to the brake cylinder, of an independent brake valve having ports for releasing air from said triple valve to apply the brakes and having a position for connecting said brake pipe to the triple valve device and for closing the outlet from the brake cylinder exhaust port to the triple valve device.

4. In a fluid pressure brake, the combination with a brake pipe, engineer's brake valve, auxiliary reservoir, and a triple valve device operated by a reduction in brake pipe pressure for supplying air from the auxiliary reservoir to the brake cylinder, of an independent brake valve having ports adapted in one position to release air from the piston of the triple valve device to supply air to the brake cylinder, and in another position to supply air from the brake pipe to said piston and close the outlet from the brake cylinder exhaust port of the triple valve device.

5. In a fluid pressure brake, the combination with a brake pipe, and an automatic valve device operated by variations in brake pipe pressure for supplying and releasing air to and from the brake cylinder, of a manually operated valve having ports adapted in one position of the valve to release air from the piston of said automatic valve device and open the fluid pressure supply passage to the brake cylinder and in another position thereof to close the outlet for releasing air from the brake cylinder and to supply air to said piston to close the supply passage.

6. In a fluid pressure brake, the combination with a brake pipe, and an automatic valve device operated by a reduction in brake pipe pressure for applying the brakes, of a manually operated valve having ports adapted in one position to release air from said valve device to apply the brakes, and in another position to open a direct exhaust passage from the brake cylinder to release the brakes.

7. In a fluid pressure brake, the combination with a brake pipe and a triple valve device operated by variations in brake pipe pressure for controlling the direct admission and release of fluid under pressure to and from the brake cylinder, of a manually operated valve having means for releasing the brakes and also for varying the pressure on said triple valve device to apply the brakes independently of the brake pipe pressure.

8. In a fluid pressure brake, the combination with a triple valve device operated by variations in train pipe pressure for supplying and releasing air to and from the brake cylinder and an engineer's brake valve for controlling the variations in train pipe pressure, of an independent brake valve for also operating the triple valve device and adapted to supply fluid to the auxiliary reservoir side of the triple valve device with the brakes independently applied.

In testimony whereof I have hereunto set my hand.

WALTER V. TURNER.

Witnesses:
R. F. EMERY,
EDITH B. MACDONALD.

Copies of this patent may be obtained for five cents each, by addressing the "Commissioner of Patents, Washington, D. C."